US012669863B1

(12) United States Patent
Chen et al.

(10) Patent No.: US 12,669,863 B1
(45) Date of Patent: Jun. 30, 2026

(54) METHOD AND TRACKING SYSTEM FOR CORRECTING TRACKING INFORMATION

(71) Applicant: HTC Corporation, Taoyuan City (TW)

(72) Inventors: Yu-Ming Chen, Taoyuan City (TW); Wen-Shan Yang, Taoyuan City (TW); Sheng-Hui Tao, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 0 days.

(21) Appl. No.: 19/004,452

(22) Filed: Dec. 30, 2024

(51) Int. Cl.
*G06F 3/01* (2006.01)

(52) U.S. Cl.
CPC ..................................... *G06F 3/011* (2013.01)

(58) Field of Classification Search
CPC ..................................................... G06F 3/011
See application file for complete search history.

(56) References Cited

U.S. PATENT DOCUMENTS

2022/0066456 A1*  3/2022  Ebrahimi Afrouzi ........................
        G06F 3/04883
2022/0366530 A1  11/2022  Murdison et al.
2023/0095621 A1*  3/2023  Gorur Sheshagiri .. G06V 20/46
        382/103

FOREIGN PATENT DOCUMENTS

| CN | 112527102 | 11/2022 |
|---|---|---|
| CN | 116225210 | 6/2023 |
| CN | 117455989 | 1/2024 |
| TW | I845448 | 6/2024 |

OTHER PUBLICATIONS

"Office Action of Taiwan Counterpart Application", issued on Sep. 4, 2025, p. 1-p. 7.

* cited by examiner

*Primary Examiner* — Robert J Michaud
(74) *Attorney, Agent, or Firm* — JCIPRNET

(57) ABSTRACT

Provided are a method for correcting tracking information and a tracking system. The method includes: during a tracking information correction process, obtaining, by a host, multiple host keyframes collected by the host within a first time interval; obtaining, by a tracker, multiple tracker keyframes and multiple tracker map points collected by the tracker within the first time interval; and correcting, by the host or tracker, the tracker keyframes and the tracker map points at least based on the host keyframes.

20 Claims, 9 Drawing Sheets

20

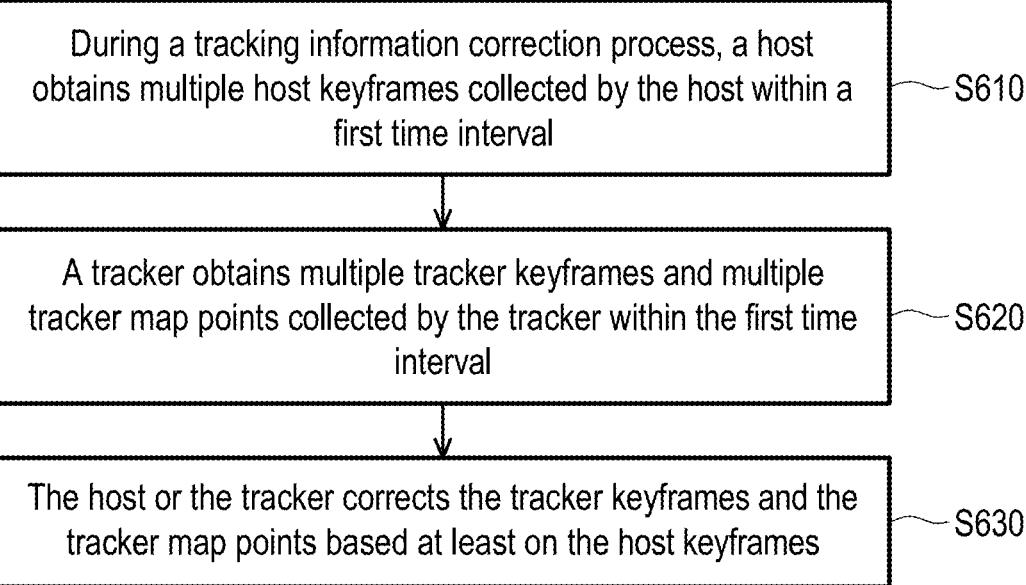

During a tracking information correction process, a host obtains multiple host keyframes collected by the host within a first time interval     ~S610

A tracker obtains multiple tracker keyframes and multiple tracker map points collected by the tracker within the first time interval     ~S620

The host or the tracker corrects the tracker keyframes and the tracker map points based at least on the host keyframes     ~S630

FIG. 6

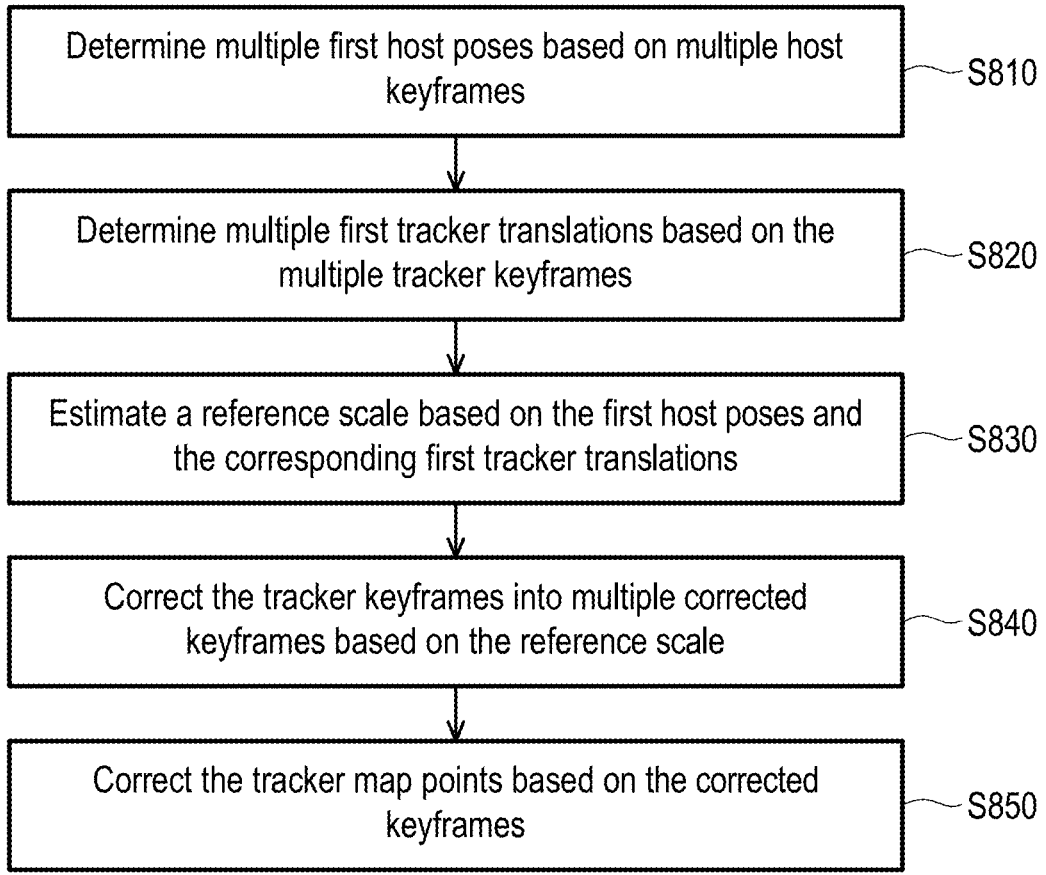

Determine multiple first host poses based on multiple host keyframes          ⌐S810

Determine multiple first tracker translations based on the multiple tracker keyframes          ⌐S820

Estimate a reference scale based on the first host poses and the corresponding first tracker translations          ⌐S830

Correct the tracker keyframes into multiple corrected keyframes based on the reference scale          ⌐S840

Correct the tracker map points based on the corrected keyframes          ⌐S850

FIG. 8

METHOD AND TRACKING SYSTEM FOR CORRECTING TRACKING INFORMATION

BACKGROUND

Technical Field

The disclosure relates to a tracking correcting mechanism, and particularly to a method for correcting tracking information.

Description of Related Art

In modern society, people often use various wearable devices to interact with visual content in reality services (such as virtual reality (VR), augmented reality (AR), mixed reality (MR), etc.) when experiencing these services provided by head-mounted displays (HMDs). These devices may be worn on various joints of the user, thereby enhancing the sense of immersion and control experience of the user.

Please refer to FIG. 1, which illustrates a schematic diagram of a user wearing a host and a tracker. In FIG. 1, a user 10 may wear a host 11 (for example, HMD) and a tracker 12 (for example, the wearable device), where the host 11 and the tracker 12 may individually execute tracking technologies such as simultaneous localization and mapping (SLAM) to track their own poses (which may include a translation and a rotation).

During the process of providing visual content for reality services, the host 11 may continuously receive the poses obtained by the tracker 12 through tracking itself, and adjust the visual content accordingly.

However, when the scale used by the tracker 12 in executing the tracking technology drifts and differs from that of the host 11, the scale may cause the movement trajectory 121 formed by the poses provided by the trackers 12 to be inconsistent with the actual movement trajectory 122 of the tracker 12.

In this circumstance, the user may not interact with the visual content as expected, thereby affecting the user experience.

SUMMARY

In view of this, the disclosure provides a method for correcting tracking information and a tracking system, which can be configured to solve the aforementioned technical problems.

An embodiment of the disclosure provides a method for correcting tracking information. The method includes: during a tracking information correction process, obtaining, by a host, multiple host keyframes collected by the host within a first time interval; obtaining, by a tracker, multiple tracker keyframes and multiple tracker map points collected by the tracker within the first time interval; and correcting, by the host or the tracker, the tracker keyframes and the tracker map points at least based on the host keyframes.

An embodiment of the disclosure provides a tracking system. The tracking system includes a host and a tracker. The tracker is connected to the host. During a tracking information correction process, the host obtains multiple host keyframes collected by the host within a first time interval. The tracker obtains multiple tracker keyframes and multiple tracker map points collected by the tracker within the first time interval. The host or the tracker corrects the tracker keyframes and the tracker map points based at least on the host keyframes.

BRIEF DESCRIPTION OF THE DRAWINGS

FIG. 6 is a flowchart illustrating a method for correcting tracking information according to an embodiment of the disclosure.

FIG. 8 is a flowchart illustrating the correction of tracker keyframes and tracker map points based on host keyframes according to the first embodiment of the disclosure.

DESCRIPTION OF THE EMBODIMENTS

Figure 2:
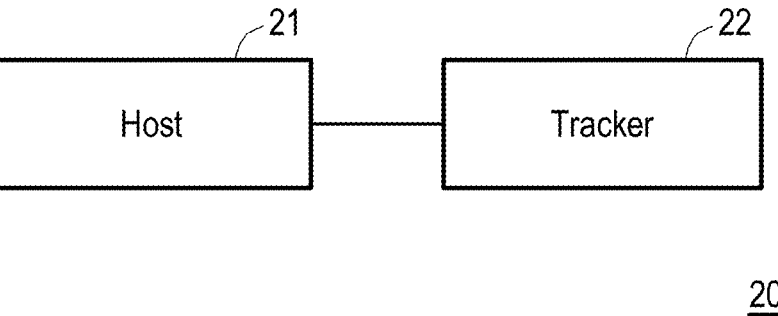
FIG. 2 is a schematic diagram illustrating a tracking system according to an embodiment of the disclosure.

Please refer to FIG. 2, which is a schematic diagram illustrating a tracking system according to an embodiment of the disclosure. In FIG. 2, a tracking system 20 may include, for example, a host 21 and a tracker 22. In different embodiments, the host 21 may be implemented as various smart devices and/or computer devices, but the disclosure is not limited thereto.

In some embodiments, the host 21 may be a device capable of executing tracking technologies such as inside-out tracking and outside-in tracking, to track its own pose. For ease of understanding, the pose obtained by the host 21 through tracking itself may be called host pose, which may include, for example, the translation and rotation of the host 21 (hereinafter referred to as the host translation and the host rotation, respectively), and may be presented in the form of six degrees of freedom, but the disclosure is not limited thereto.

In an embodiment, the host 21 may be any smart device and/or computer device capable of providing visual content for reality services, such as virtual reality (VR) services, augmented reality (AR) services, mixed reality (MR) services, and/or extended reality (XR) services, but the disclosure is not limited to thereto. In some embodiments, the host 21 may be a head-mounted display (HMD) capable of displaying/providing visual content (for example, AR/VR/MR content) for the wearer/user to view. For better understanding of the concepts of the disclosure, it is assumed hereinafter that the host 21 is an HMD and may be configured to provide rendered visual content for the user to view, but the disclosure is not limited to thereto.

In some embodiments, the tracker 22 may be a device capable of executing tracking technologies such as inside-out tracking and outside-in tracking, to track its own pose. For ease of understanding, the pose obtained by the tracker 22 through tracking itself may be called tracker pose, which may include, for example, the translation and rotation of the tracker 22 (hereinafter referred to as the tracker translation and the tracker rotation, respectively), and may be presented in the form of six degrees of freedom, but the disclosure is not limited thereto.

In some embodiments, the host 21 and the tracker 22 may be disposed at a first position and a second position, respectively, on the same subject. For example, in an embodiment where the host 21 is an HMD, the host 21 may be worn on the head (i.e., the first position) of the user. Additionally, the tracker 22 may be a wearable device (for example, wristband/ankle band/waistband) and may be worn on the body of the user. In this situation, the wearing position of the tracker 22 on the body of the user (for example, wrist/ankle/waist) may be understood as the second position.

In an embodiment, the tracker 22 may be, for example, a peripheral device/accessory of the host 21, and may communicate with the host 21 through wired and/or wireless protocols. In an embodiment, the tracker 22 may send/report the obtained tracker pose (for example, the tracker translation and the tracker rotation) to the host 21, for the host 21 to adjust the rendered visual content accordingly, but the disclosure is not limited to thereto.

However, as mentioned earlier, when the scale applied by the tracker 22 during tracking drifts, the scale may result in a situation where the trajectory obtained through tracking is inconsistent with the actual trajectory.

In view of this, the embodiment of the disclosure proposes a method for correcting tracking information, which may be configured to solve the aforementioned technical problems.

For ease of understanding, it is assumed hereinafter that the tracking technology executed by both the host 21 and the tracker 22 is SLAM, but is only used as an example, and is not intended to limit the possible implementations of the disclosure.

In the circumstance where the host 21 is assumed to apply SLAM, the host 21 may shoot/capture multiple image frames of the surrounding environment by a built-in tracking camera thereof, and a part of these image frames may be determined by the host 21 as keyframes (hereinafter referred to as host keyframes) in SLAM technology. Similarly, the tracker 22 may also determine corresponding keyframes (hereinafter referred to as tracker keyframes) during the process of executing the SLAM technology.

Generally, the keyframes in the SLAM technology are some representative image frames chosen to be preserved by the positioning device (for example, the host 21 and/or the tracker 22) applying SLAM. These image frames include rich environmental feature information and may be configured to record the observation of the camera (for example, a tracking camera) at a specific location. Associated with each keyframe is the pose of the camera (which may be characterized in the form of six degrees of freedom) and the extracted map points. The keyframes are not necessarily image frames at every moment, but are more likely to be image frames selected according to a certain strategy. For example, when there is a significant change in the pose of the camera and/or the pose of the positioning device, or when there is a significant change in environmental features, the corresponding image frames may be recorded as keyframes. These keyframes constitute the map in the SLAM system, and are configured to help the positioning device relocating in the subsequent positioning process to recover the pose of the positioning device.

Accordingly, the host 21 and the tracker 22 may respectively determine corresponding map points based on the respective keyframes, hereinafter referred to as host map points and tracker map points, respectively, but the disclosure is not limited to thereto.

Figure 1:
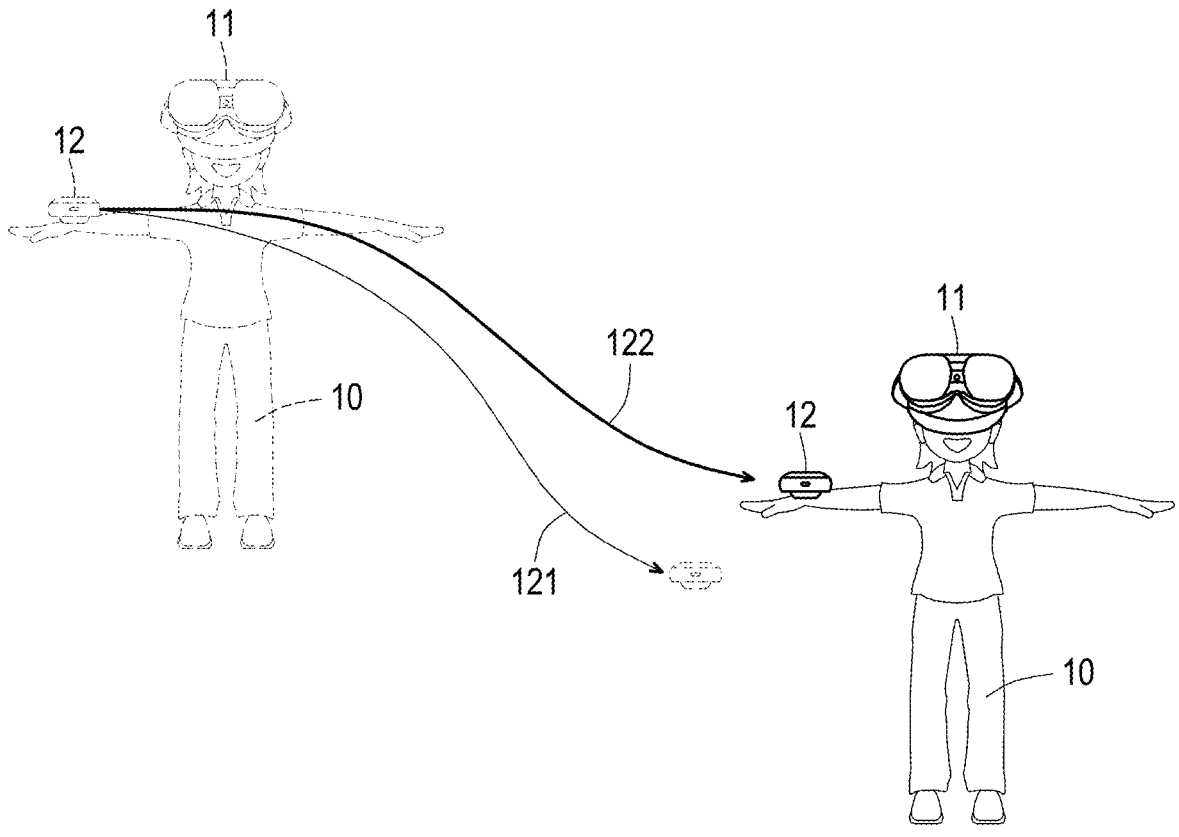
FIG. 1 illustrates a schematic diagram of a user wearing a host and a tracker.

In the embodiment of the disclosure, when the scale applied by the tracker 22 drifts, the scale may cause the relevant tracking information of the tracker 22 (for example, the tracker keyframes and/or the tracker map points) to be inaccurate, thereby leading to the trajectory inconsistency situation as shown in FIG. 1.

Accordingly, in the embodiment of the disclosure, the host 21 and the tracker 22 may collaboratively execute a tracking information correction process to correct the aforementioned tracking information.

In the embodiment of the disclosure, the host 21 may send the tracked host pose (for example, the host translation and the host rotation) and/or the tracking information of the host 21 (for example, the host keyframes and the host map points) to the tracker 22, for the tracker 22 to perform operations such as correcting the tracking information accordingly, but the disclosure is not limited thereto.

In an embodiment, the aforementioned tracking information correction process may be manually triggered by the user through performing specific operations on the host 21. In another embodiment, the tracking system 20 may determine whether to initiate the tracking information correction process by itself according to a certain mechanism.

In the embodiment of the disclosure, since the host 21 and the tracker 22 are assumed to be disposed at the first position and the second position on the subject, respectively, the possible tracker translation of the tracker 22 should have a certain movement range in response to the host pose and the structure of the subject itself.

Therefore, the circumstance where the tracker translation reported by the tracker 22 to the host 21 is not within the aforementioned movement range indicates that the aforementioned trajectory inconsistency situation may have occurred. In this circumstance, the host 21 may determine that it is necessary to execute the tracking information correction process to correct the aforementioned tracking information.

Figure 3:
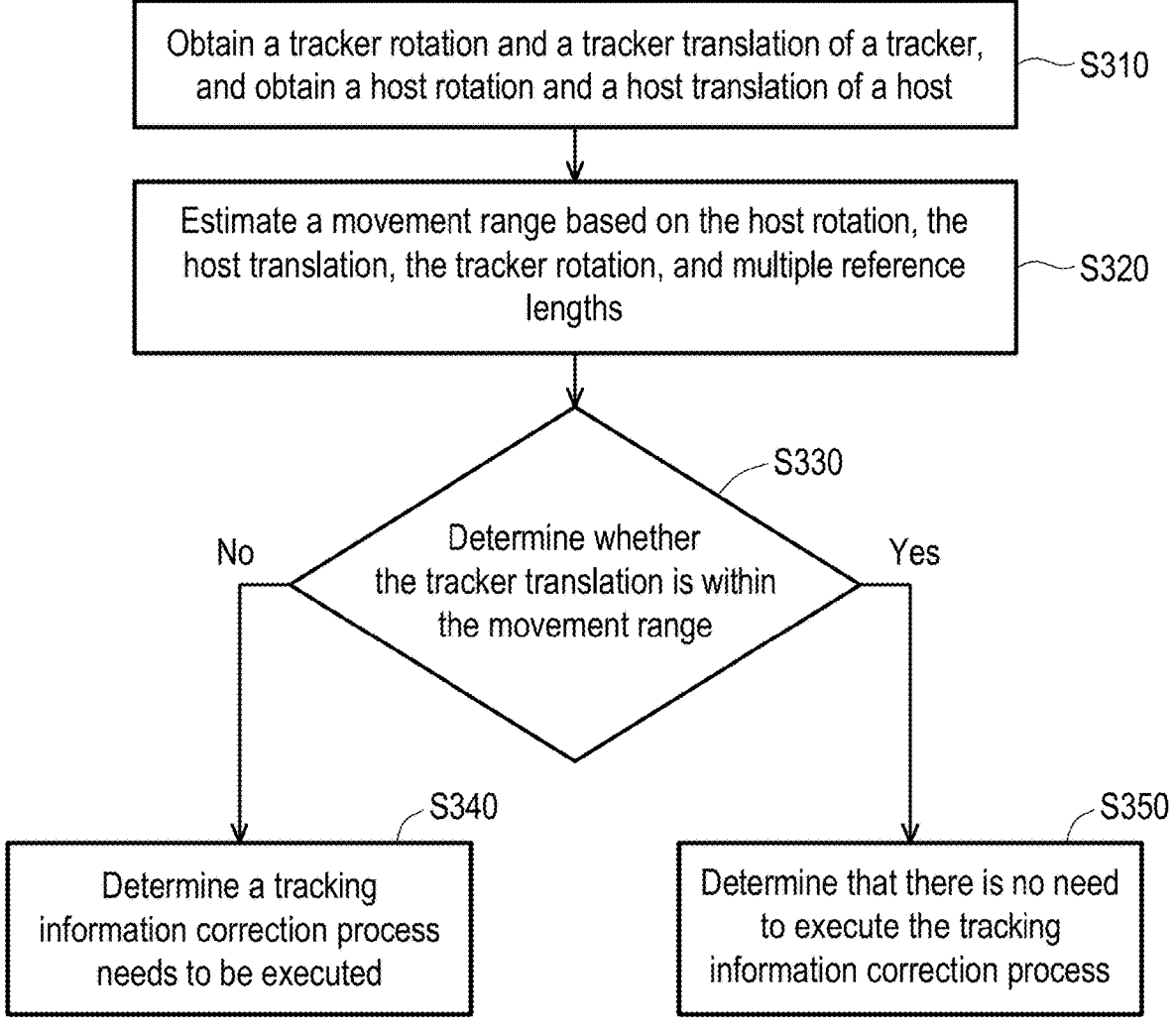
FIG. 3 is a flowchart illustrating a determination of whether to initiate a tracking information correction process according to an embodiment of the disclosure.

Please refer to FIG. 3, which is a flowchart illustrating a determination of whether to initiate a tracking information correction process according to an embodiment of the disclosure.

In Step S310, the host 21 obtains the tracker rotation and the tracker translation of the tracker 22, and obtains the host rotation and the host translation of the host 21.

In an embodiment, the tracker rotation (hereinafter referred to as TR), the tracker translation (hereinafter referred to as TT), the host rotation (hereinafter referred to as HR), and the host translation (hereinafter referred to as HT) obtained by the host 21 in Step S310 are, for example, data corresponding to the same time point, but are not limited to thereto.

In Step S320, the host 21 estimates the movement range based on the host rotation HR, the host translation HT, the tracker rotation TR, and multiple reference lengths.

In an embodiment where the host 21 and the tracker 22 are assumed to be disposed at the first position and the second position on the subject, respectively, there may be multiple moving sections connected between the first position and the second position, and the reference lengths may be the lengths of these moving sections. In the embodiment of the disclosure, one of two connected moving sections may pivot relative to the other moving section. Additionally, the moving section connected to the first position may pivot with the first position as the pivot point, while the moving section connected to the second position may pivot with the second position as the pivot point.

Figure 4:
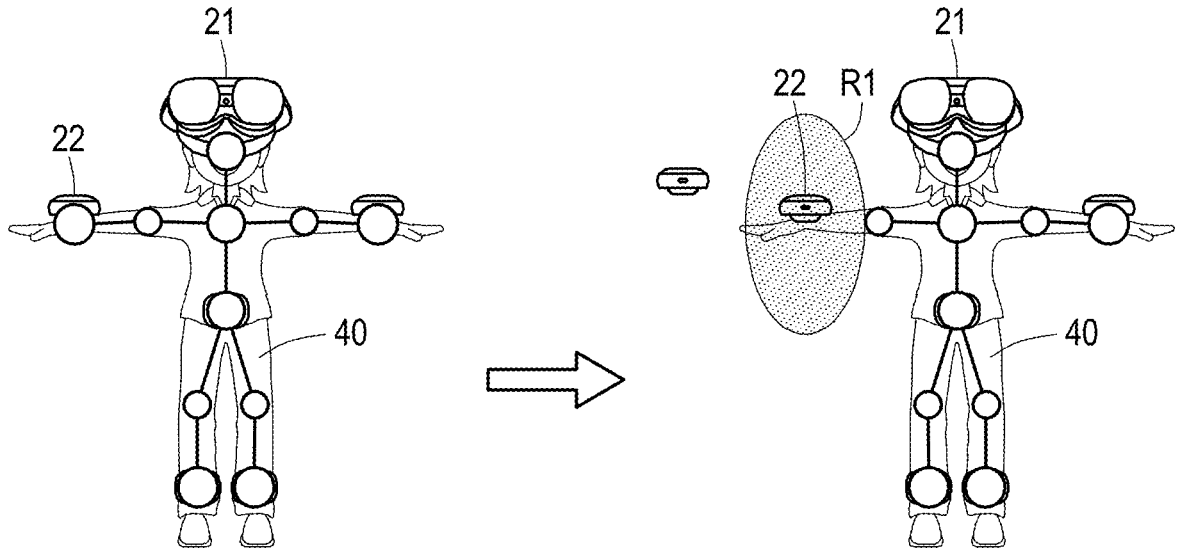
FIG. 4 illustrates an application scenario according to an embodiment of the disclosure.

To make the concept of FIG. 3 comprehensible, the following explanation is provided in accompanying with FIG. 4, where FIG. 4 illustrates an application scenario according to an embodiment of the disclosure.

In FIG. 4, the host 21 and the tracker 22 may be worn/disposed on a head (that is, the first position) and a right wrist (that is, the second position) of a user 40 (that is, the considered subject), respectively. In this circumstance, various limbs (for example, right forearm, right upper arm, neck, etc.) between the first position and the second position may be understood as moving sections connected between the first position and the second position, and the length of each limb may be understood as the considered reference length.

In different embodiments, the lengths corresponding to each moving section/limb may be manually set, or may be automatically determined by the host 21 through a certain procedure.

For example, the host 21 may first request the user 40 to perform the action (hereinafter referred to as the first action) shown in the right half of FIG. 4, and then use the obtained tracker translation as the translation of the right wrist of the user 40. Subsequently, the host 21 may request the user 40 to change from the first action to a second action. The difference between the second action and the first action may only be that the user 40 has bent the right elbow. In this circumstance, the host 21 may determine the length of the right forearm and/or the joint translation of the right elbow of the user 40 based on the tracker translations reported by the tracker 22 worn on the right wrist in the first action and the second action, respectively.

For other limbs, the host 21 may determine the corresponding lengths based on a mechanism similar to the aforementioned teaching. For example, the host 21 may request the user 40 to change from the first action to a third action. The difference between the third action and the first action may only be that the user 40 has bent the left elbow. In this circumstance, the host 21 may determine the length of left forearm and/or the joint translation of the left elbow of the user 40 based on the tracker translations reported by the tracker (not separately labeled) worn on the left wrist in the first action and the third action, respectively.

For another example, the host 21 may request the user 40 to change from the first action to a fourth action. The difference between the fourth action and the first action may only be that the user 40 has bent the left knee. In this circumstance, the host 21 may determine the length of the left lower leg and/or the joint translation of the left knee of the user 40 based on the tracker translations reported by the tracker (not separately labeled) worn on the left ankle in the first action and the fourth action, respectively, but the disclosure is not limited thereto.

As mentioned earlier, the tracker translation that the tracker 22 may have should have a certain movement range R1 in response to the host rotation and the structure of the subject itself. In an embodiment, the host 21 may execute an inverse kinematics (IK) algorithm based on the host rotation HR, the tracker rotation TR, and the reference lengths to estimate the movement range R1.

Figure 5:
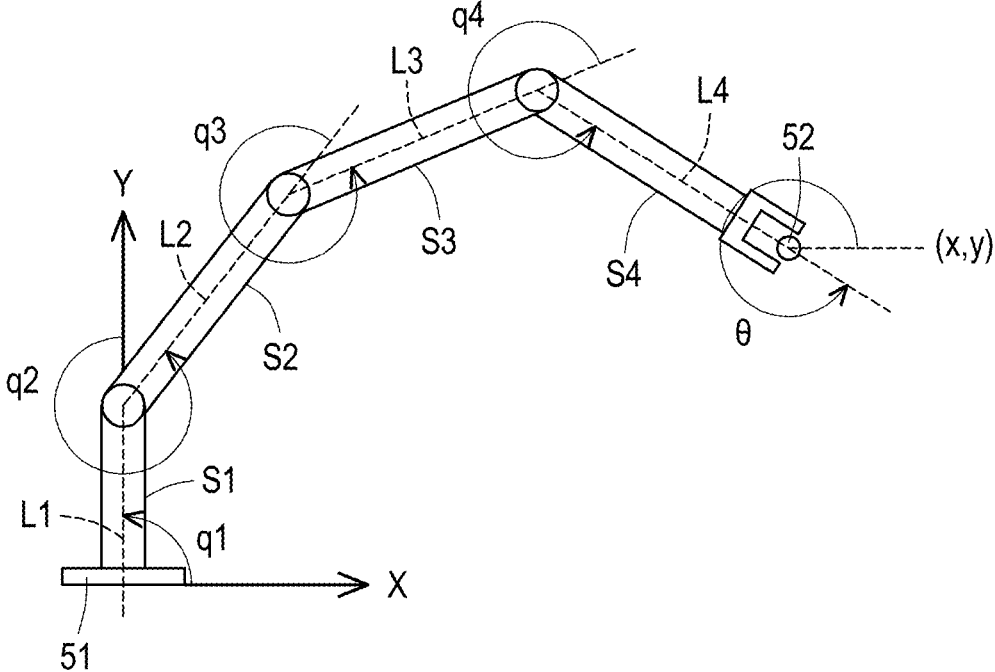
FIG. 5 is a schematic diagram illustrating an IK mechanism according to an embodiment of the disclosure.

Please refer to FIG. 5, which is a schematic diagram illustrating an IK mechanism according to an embodiment of the disclosure. In FIG. 5, it is assumed that multiple moving sections S1 to S4 are connected between the first reference point 51 and the second reference point 52, and the lengths of the moving sections S1 to S4 are lengths L1 to L4, respectively.

Additionally, one of two connected moving sections may perform a pivoting motion relative to the other moving section. For example, the moving section S2 may perform a pivoting motion relative to the moving section S3, and the moving section S3 may also perform a pivoting motion relative to the moving section S2. Furthermore, the moving section S4 may perform a pivoting motion relative to the moving section S3, and the moving section S3 may also perform a pivoting motion relative to the moving section S4, but the disclosure is not limited thereto.

In this circumstance, the moving section S1 may be understood to be connected to the moving section S2 by the pivot point P1; the moving section S2 may be understood to be connected to the moving section S3 by the pivot point P2; the moving section S3 may be understood to be connected to the moving section S4 by the pivot point P3, but the disclosure is not limited thereto.

Additionally, the moving section S1 connected to the first reference point 51 may pivot by using the first position as a pivot point, while the moving section S4 connected to the second reference point 52 may pivot by using the second position as a pivot point.

In FIG. 5, the pivot angle corresponding to the first reference point 51 is, for example, an angle q1, the pivot angle corresponding to the pivot point P1 is, for example, an angle q2, the pivot angle corresponding to the pivot point P2 is, for example, an angle q3, the pivot angle corresponding to the pivot point P3 is, for example, an angle q4, and the pivot angle corresponding to the second reference point 52 is, for example, an angle θ.

In the concept of IK, angles q2 to q4 have a certain angular range, so when the translation of the first reference point 51, the angle q1, the angle θ, and the lengths L1 to L4 are known, the possible translations (represented as (x, y)) where the second reference point 52 may appear also have a corresponding range.

Therefore, in the scenario of FIG. 4, if the host translation HT, the host rotation HR, and the tracker rotation TR are understood to correspond to the first reference point 51, the angle q1, and the angle θ in FIG. 5, respectively, then when the lengths of limbs such as the right forearm, the right upper arm, and the neck (which may be understood to correspond to the moving sections connected between the first reference point 51 and the second reference point 52 in FIG. 4) are known, the host 21 may estimate the range of possible translations (which may be understood to correspond to the second reference point 52 in FIG. 5) where the tracker 22 may appear based on the concept of IK. In this embodiment, the host 21 may determine this range as the movement range R1, but the disclosure is not limited thereto.

Accordingly, in step S330 of FIG. 3, the host 21 may determine whether the tracker translation TT is within the movement range R1.

If the determination is yes, it is shown that the aforementioned trajectory inconsistency situation has not yet occurred, and thus the host 21 may execute step S350 to determine that there is no need to execute the tracking information correction process. From another perspective, if the host 21 determines that the tracker translation TT is not within the movement range R1, it is shown that the aforementioned trajectory inconsistency situation may have occurred, and thus the host 21 may execute step S340 to determine that the tracking information correction process needs to be executed.

Please refer to FIG. 6, which is a flowchart illustrating a method for correcting tracking information according to an embodiment of the disclosure.

The method of this embodiment may be executed collaboratively by the host 21 and the tracker 22. The details of each step in FIG. 6 are described below in accompanying with the elements shown in FIG. 2.

In step S610, during the tracking information correction process, the host 21 obtains the host keyframes collected by the host 21 within a first time interval.

In step S620, the tracker 22 obtains the tracker keyframes and the tracker map points collected by the tracker 22 within the first time interval.

In step S630, the host 21 or the tracker 22 corrects the tracker keyframes and the tracker map points based at least on the host keyframes.

In different embodiments, steps S610 to S630 may be implemented in different ways, which are further described below.

In an embodiment of the disclosure, the first time interval may be, for example, a certain time interval during the tracking information correction process, during which the host 21 and the tracker 22 may respectively execute SLAM to obtain the relevant information in steps S610 and S620, but the disclosure is not limited thereto.

In the first embodiment, during the tracking information correction process, the host 21 may request the subject equipped with the host 21 and the tracker 22 to perform a specific action while maintaining the distance between the first position and the second position. Subsequently, the host 21 and the tracker 22 may then use the time interval during which the subject performs the specific action as the first time interval.

Figure 7:
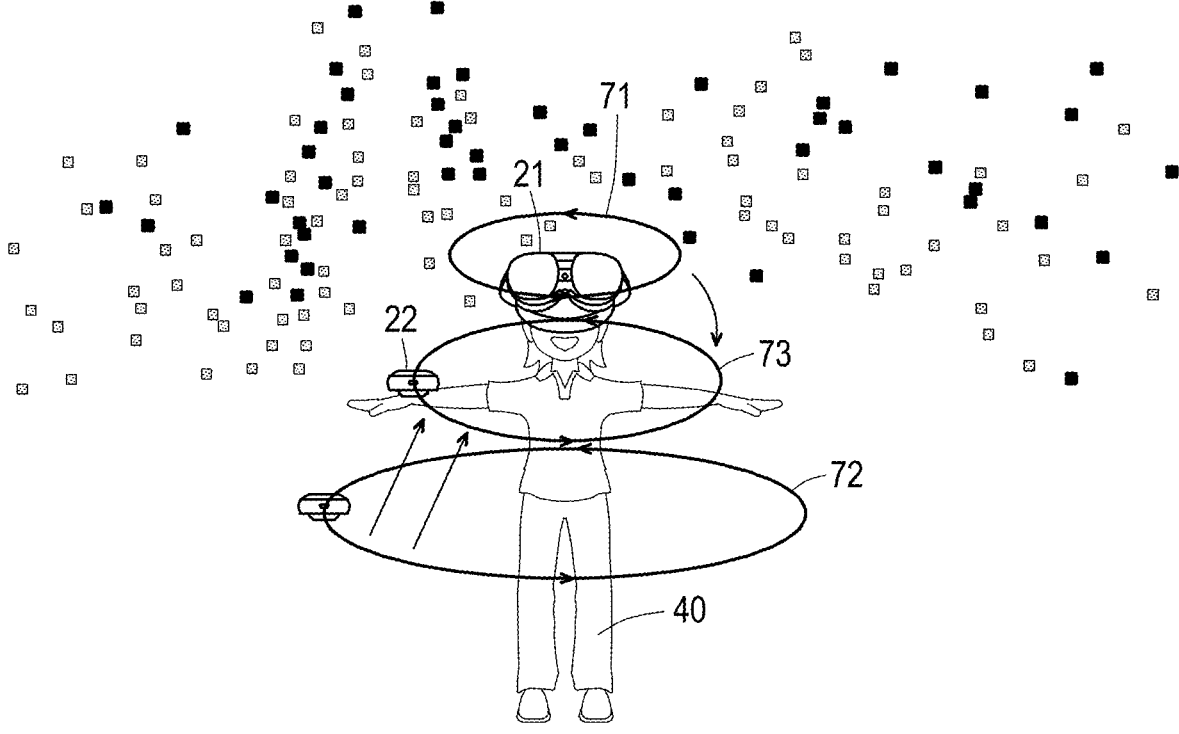
FIG. 7 is a schematic diagram illustrating an application scenario according to a first embodiment of the disclosure.

Please refer to FIG. 7, which is a schematic diagram illustrating an application scenario according to a first embodiment of the disclosure.

In the scenario of FIG. 7, the considered subject may be, for example, the user 40, and the first position where the host 21 is disposed and the second position where the tracker 22 is disposed may be the same as in the scenario of FIG. 4.

In this embodiment, the specific action that the host 21 requests the user 40 to perform may be, for example, rotating in place while keeping both arms raised horizontally, where a distance between the host 21 and the tracker 22 remains unchanged during the process of the user 40 performing the specific action, but the disclosure is not limited thereto.

In other embodiments, designers may design different specific actions according to requirements, as long as the distance between the host 21 and the tracker 22 remains substantially unchanged during the process of the user performing the specific action, and there is a relative rotation between the host 21 and the tracker 22 during the specific action, but the disclosure is not limited thereto.

In FIG. 7, the host 21 and the tracker 22 may use the time interval during which the user 40 performs the specific action as the first time interval, but the disclosure is not limited thereto.

In the first implementation, the host 21 may implement step S630 based on the workflow in FIG. 8.

Please refer to FIG. 8, which is a flowchart illustrating the correction of tracker keyframes and tracker map points based on host keyframes according to the first embodiment of the disclosure.

In step S810, the host 21 may determine multiple first host poses (for example, including host translation and host rotation) based on multiple host keyframes (collected within the first time interval).

In the embodiment of the disclosure, details of how the positioning device (for example, the host 21 and/or the tracker 22) determines the corresponding positioning device pose (for example, the host pose and/or the tracker pose) based on the obtained keyframes may refer to relevant literature on the SLAM technology, which is not further described here.

In the scenario of FIG. 7, the trajectory formed by the first host poses is, for example, a trajectory 71, but the disclosure is not limited thereto.

In step S820, the host 21 determines multiple first tracker translations based on multiple tracker keyframes (collected within the first time interval).

In the scenario of FIG. 7, the trajectory formed by the multiple first tracker translations is, for example, a trajectory 72, but the disclosure is not limited thereto.

As can be seen from FIG. 7, the trajectory 72 may have substantially deviated from an actual trajectory 73 of the tracker 22. Accordingly, the host 21 or the tracker 22 may correspondingly execute steps S830 to S850 to address this issue.

Accordingly, in step S830, the host 21 or the tracker 22 estimates a reference scale (hereinafter referred to as S) based on the first host poses and the corresponding first tracker translations.

In the first embodiment, the first tracker translation at the i-th time point (i being the time index) of the first time interval may be represented as:

$$\prescript{G}{Tracker}{T_i} = S \cdot \left( \prescript{G}{HMD}{T_i} + \prescript{G}{HMD}{R_i} \cdot \prescript{HMD}{Tracker}{T} \right)$$

where $$\prescript{G}{HMD}{T_i}$$

is the host translation at the i-th time point of the first time interval, $$\prescript{G}{HMD}{R_i}$$

is the host rotation at the i-th time point of the first time interval, $$\prescript{HMD}{Tracker}{T}$$

is configured to represent the relative translation between the host 21 and the tracker 22 (which may include, for example, multiple extrinsic parameters between the host 21 and the tracker 22).

In the first embodiment, the host 21 or the tracker 22 may estimate a value of the reference scale S by using, for example, linear regression, after collecting $$\prescript{G}{Tracker}{T_i}, \ \prescript{G}{HMD}{T_i}, \text{ and } \prescript{G}{HMD}{R_i}$$

corresponding to different i values, but the disclosure is not limited thereto.

Subsequently, in step S840, the tracker 22 may correct the tracker keyframes into multiple corrected keyframes based on the reference scale S.

In an embodiment, the tracker 22 may, for example, divide the scale of the tracker keyframes (collected within the first time interval) by the reference scale S to determine the corrected keyframes.

In the scenario of FIG. 7, step S840 may be understood as the tracker 22 correcting the tracker keyframes corresponding to the trajectory 72 into the tracker keyframes corresponding to the trajectory 73 (that is, the corrected keyframes), but the disclosure is not limited thereto.

Subsequently, in step S850, the tracker 22 may correct multiple tracker map points (which are illustrated, for example, as small rectangular boxes in FIG. 7) based on the corrected keyframes.

In an embodiment, the tracker 22 may execute bundle adjustment (BA) based on the corrected keyframes to correct the tracker map points.

In the embodiment of the disclosure, the details of the tracker 22 executing BA may refer to technical literature related to BA, which are not further elaborated here.

Subsequently, the tracker 22 may track the tracker pose of the tracker 22 based on the corrected tracker keyframes and the corrected tracker map points.

From the above, it may be understood that the tracking information (such as the tracker keyframes and/or the tracker map points) used by the tracker 22 has all been corrected after steps S810 to S850 are executed. Therefore, when performing subsequent tracking, the tracker 22 may obtain the correct tracker pose, thereby avoiding the trajectory inconsistency situation as shown in FIG. 1.

In the second embodiment, after initiating the tracking information correction process, the host 21 may execute SLAM within the first time interval to obtain the host keyframes and multiple host map points corresponding to the first time interval. Similarly, the tracker 22 may also execute SLAM within the first time interval to obtain the tracker keyframes and the tracker map points corresponding to the first time interval.

Figure 9:
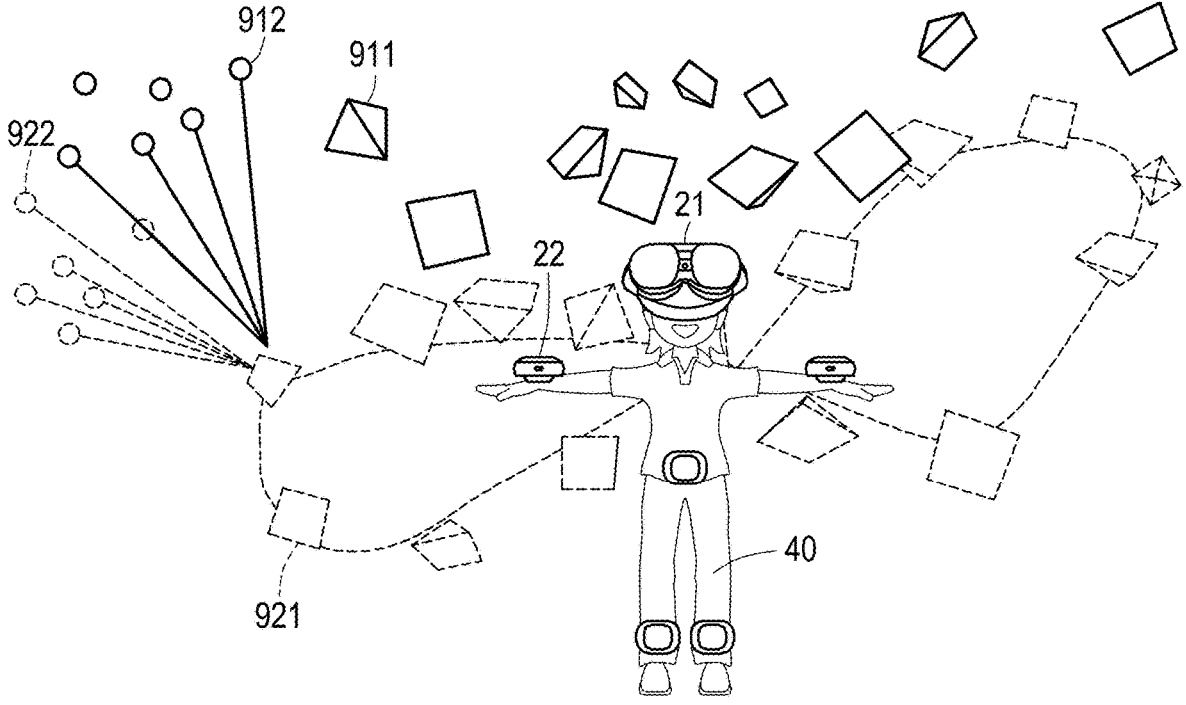
FIG. 9 illustrates an application scenario according to a second embodiment of the disclosure.

Please refer to FIG. 9, which illustrates an application scenario according to a second embodiment of the disclosure.

In FIG. 9, the host 21 may, for example, execute SLAM within the first time interval to obtain multiple host keyframes 911 (represented by the solid polygonal three-dimensional objects shown) and multiple host map points 912 (represented by the solid circular three-dimensional objects shown) corresponding to the first time interval.

Additionally, the tracker 22 may, for example, execute SLAM within the first time interval to obtain multiple tracker keyframes 921 (represented by the dotted polygonal three-dimensional objects shown) and multiple tracker map points 922 (represented by the dotted circular three-dimensional objects shown) corresponding to the first time interval.

Unlike the first embodiment, in the second embodiment, the user 40 is not required to perform specific actions, but may simply move randomly. In this circumstance, the host 21 and the tracker 22 may be understood to have established a first SLAM map and a second SLAM map, respectively, corresponding to the first time interval.

Subsequently, the tracker 22 may receive the host keyframes 911 and the host map points 912 from the host 21, and correct the tracker keyframes 921 and the tracker map points 922 according to the host keyframes 911 and the host map points 912.

In an embodiment, the tracker 22 executes BA according to the host keyframes 911 and the host map points 912 to correct the tracker keyframes 921 and the tracker map points 922, but is not limited thereto.

From another perspective, the aforementioned operations may be understood as the host 21, providing relevant information of this first SLAM map to the tracker 22 after establishing the first SLAM map corresponding to the first time interval, to allow the tracker 22 to correct the second SLAM map based on the received information of the first SLAM map, but may not be limited thereto.

Subsequently, the tracker 22 may track the tracker pose of the tracker 22 based on the corrected tracker keyframes and the corrected tracker map points.

From the above, it may be understood that the tracking information (for example, the tracker keyframes and/or the tracker map points) used by the tracker 22 has all been corrected after the mechanism of the second embodiment is executed. Therefore, when performing subsequent tracking, the tracker 22 may obtain the correct tracker pose, thereby avoiding the trajectory inconsistency situation as shown in FIG. 1.

It should be understood that, although the aforementioned embodiments are described by using a single tracker 22 as an example, the method of the embodiment of the disclosure may also be applied to other trackers disposed on the same subject, and is not limited to the tracker 22.

In summary, the method proposed in the embodiment of this disclosure may avoid/solve the trajectory inconsistency situation caused by the tracker using a scale inconsistent with the host when performing tracking. Accordingly, the user may interact with the visual content more as expected, thereby better ensuring the user experience.

Although the disclosure has been disclosed in the aforementioned embodiments, it is not intended to limit the disclosure. Any person skilled in the art may make some modifications and refinements without departing from the spirit and scope of the disclosure. Therefore, the protection scope of the disclosure should be defined by the appended claims.

What is claimed is:

1. A method for correcting tracking information, comprising:

during a tracking information correction process, obtaining, by a host, a plurality of host keyframes collected by the host within a first time interval, wherein the plurality of host keyframes are obtained when a pose of camera of the host changes;

obtaining, by a tracker, a plurality of tracker keyframes and a plurality of tracker map points collected by the tracker within the first time interval, wherein the plurality of tracker keyframes are obtained when a pose of camera of the tracker changes; and correcting, by the host or the tracker, the tracker keyframes and the tracker map points at least based on the host keyframes.

2. The method according to claim 1, further comprising:

obtaining, by the host, a tracker rotation and a tracker translation of the tracker, and obtaining a host rotation of the host;

estimating, by the host, a movement range based on the host rotation, the tracker rotation, and a plurality of reference lengths;

in response to determining that the tracker translation is not within the movement range, determining, by the host, that the tracking information correction process needs to be executed; and in response to determining that the tracker translation is within the movement range, determining, by the host, that the tracking information correction process does not need to be executed.

3. The method according to claim 2, wherein the host is disposed at a first position on a subject, the tracker is disposed at a second position on the subject, a plurality of moving sections are connected between the first position and the second position, and the reference lengths are lengths of the moving sections respectively, and estimating the movement range based on the host rotation, the tracker rotation, and the reference lengths comprises:

executing an inverse kinematics algorithm based on the host rotation, the tracker rotation, and the reference lengths to estimate the movement range.

4. The method according to claim 1, wherein the host is disposed at a first position on a subject, the tracker is disposed at a second position on the subject, and the method further comprises:

during the tracking information correction process, requesting the subject to execute a specific action while maintaining a distance between the first position and the second position; and using a time interval during which the subject executes the specific action as the first time interval.

5. The method according to claim 4, wherein correcting, by the host or the tracker, the tracker keyframes and the tracker map points at least based on the host keyframes comprises:

determining, by the host, a plurality of first host poses based on the host keyframes;

determining, by the host, a plurality of first tracker translations based on the tracker keyframes, wherein the first host poses correspond to the first tracker translations respectively;

estimating, by the host or the tracker, a reference scale based on the first host poses and the corresponding first tracker translations;

correcting, by the tracker, the tracker keyframes into a plurality of corrected keyframes based on the reference scale; and correcting, by the tracker, the tracker map points based on the corrected keyframes.

6. The method according to claim 5, wherein correcting the tracker map points based on the corrected keyframes comprises:

executing, by the tracker, a bundle adjustment based on the corrected keyframes to correct the tracker map points.

7. The method according to claim 1, wherein correcting, by the host or the tracker, the tracker keyframes and the tracker map points at least based on the host keyframes comprises:

obtaining, by the host, a plurality of host keyframes and a plurality of host map points collected by the host within the first time interval; and receiving, by the tracker, the host keyframes and the host map points from the host, and correcting the tracker keyframes and the tracker map points according to the host keyframes and the host map points.

8. The method according to claim 7, wherein correcting, by the host or the tracker, the tracker keyframes and the tracker map points at least based on the host keyframes comprises:

executing, by the tracker, a bundle adjustment according to the host keyframes and the host map points to correct the tracker keyframes and the tracker map points.

9. The method according to claim 1, further comprising:

tracking, by the tracker, a tracker pose of the tracker based on the corrected tracker keyframes and the corrected tracker map points.

10. The method according to claim 1, wherein the tracking information correction process is manually triggered.

11. A tracking system, comprising:

a host; and a tracker, connected to the host, wherein:

during a tracking information correction process, the host obtains a plurality of host keyframes collected by the host within a first time interval, wherein the plurality of host keyframes are obtained when a pose of camera of the host changes;

the tracker obtains a plurality of tracker keyframes and a plurality of tracker map points collected by the tracker within the first time interval, wherein the plurality of tracker keyframes are obtained when a pose of camera of the tracker changes; and the host or the tracker corrects the tracker keyframes and the tracker map points at least based on the host keyframes.

12. The tracking system according to claim 11, wherein:

the host obtains a tracker rotation and a tracker translation of the tracker, and obtains a host rotation and a host translation of the host;

the host estimates a movement range based on the host rotation, the host translation, the tracker rotation, and a plurality of reference lengths;

in response to determining that the tracker translation is not within the movement range, the host determines that the tracking information correction process needs to be executed; and in response to determining that the tracker translation is within the movement range, the host determines that the tracking information correction process does not need to be executed.

13. The tracking system according to claim 12, wherein the host is disposed at a first position on a subject, the tracker is disposed at a second position on the subject, a plurality of moving sections are connected between the first position and the second position, and the reference lengths are lengths of the moving sections respectively, and the host is configured to execute:

executing an inverse kinematics algorithm based on the host rotation, the tracker rotation, and the reference lengths to estimate the movement range.

14. The tracking system according to claim 11, wherein the host is disposed at a first position on a subject, and the tracker is disposed at a second position on the subject, wherein:

during the tracking information correction process, the host requests the subject to execute a specific action while maintaining a distance between the first position and the second position; and the host and the tracker use a time interval during which the subject executes the specific action as the first time interval.

15. The tracking system according to claim 14, wherein:

the host determines a plurality of first host poses based on the host keyframes;

the host determines a plurality of first tracker translations based on the tracker keyframes, wherein the first host poses correspond to the first tracker translations respectively;

the host or the tracker estimates a reference scale based on the first host poses and the corresponding first tracker translations;

the tracker corrects the tracker keyframes into a plurality of corrected keyframes based on the reference scale; and the tracker corrects the tracker map points based on the corrected keyframes.

16. The tracking system according to claim 15, wherein the tracker executes a bundle adjustment based on the corrected keyframes to correct the tracker map points.

17. The tracking system according to claim 11, wherein:

the host obtains a plurality of host keyframes and a plurality of host map points collected by the host within the first time interval; and the tracker receives the host keyframes and the host map points from the host, and corrects the tracker keyframes and the tracker map points according to the host keyframes and the host map points.

18. The tracking system according to claim 17, wherein:

the tracker executes a bundle adjustment according to the host keyframes and the host map points to correct the tracker keyframes and the tracker map points.

19. The tracking system according to claim 11, wherein the tracker is further configured to execute:

tracking a tracker pose of the tracker based on the corrected tracker keyframes and the corrected tracker map points.

20. The tracking system according to claim 11, wherein the tracking information correction process is manually triggered.

* * * * *